United States Patent [19]

Jannin

[11] Patent Number: 4,907,380
[45] Date of Patent: Mar. 13, 1990

[54] PROTECTION DEVICE FOR BALES

[76] Inventor: Dennis R. Jannin, Rte. 5, Perryville, Mo. 63775

[21] Appl. No.: 386,156

[22] Filed: Jul. 28, 1989

Related U.S. Application Data

[63] Continuation-in-part of Ser. No. 364,856, Jun. 12, 1989.

[51] Int. Cl.⁴ .............................................. B65D 71/00
[52] U.S. Cl. ............................................... 52/4; 52/3; 206/83.5; 150/154
[58] Field of Search ..................... 52/3, 4, 5; 150/154; 206/83.5

[56]         References Cited
U.S. PATENT DOCUMENTS

| 252,168 | 1/1882 | Angus | 52/5 |
|---|---|---|---|
| 404,577 | 6/1889 | Thatcher . | |
| 477,701 | 6/1892 | Rice . | |
| 846,627 | 3/1907 | Schoenle | 52/5 |
| 1,092,707 | 4/1914 | Freeland . | |
| 1,095,484 | 5/1914 | Wright | 52/5 |
| 4,041,654 | 8/1977 | Nedila . | |
| 4,712,672 | 12/1987 | Roy et al. | 52/3 |

Primary Examiner—David A. Scherbel
Assistant Examiner—Michele A. Van Patten
Attorney, Agent, or Firm—Haverstock, Garrett and Roberts

[57] ABSTRACT

A protection device for protecting bales of materials such as hay, straw, etc. having an end panel adapted to prevent animals from feeding from the end of the bale when the protection device is in place.

6 Claims, 2 Drawing Sheets

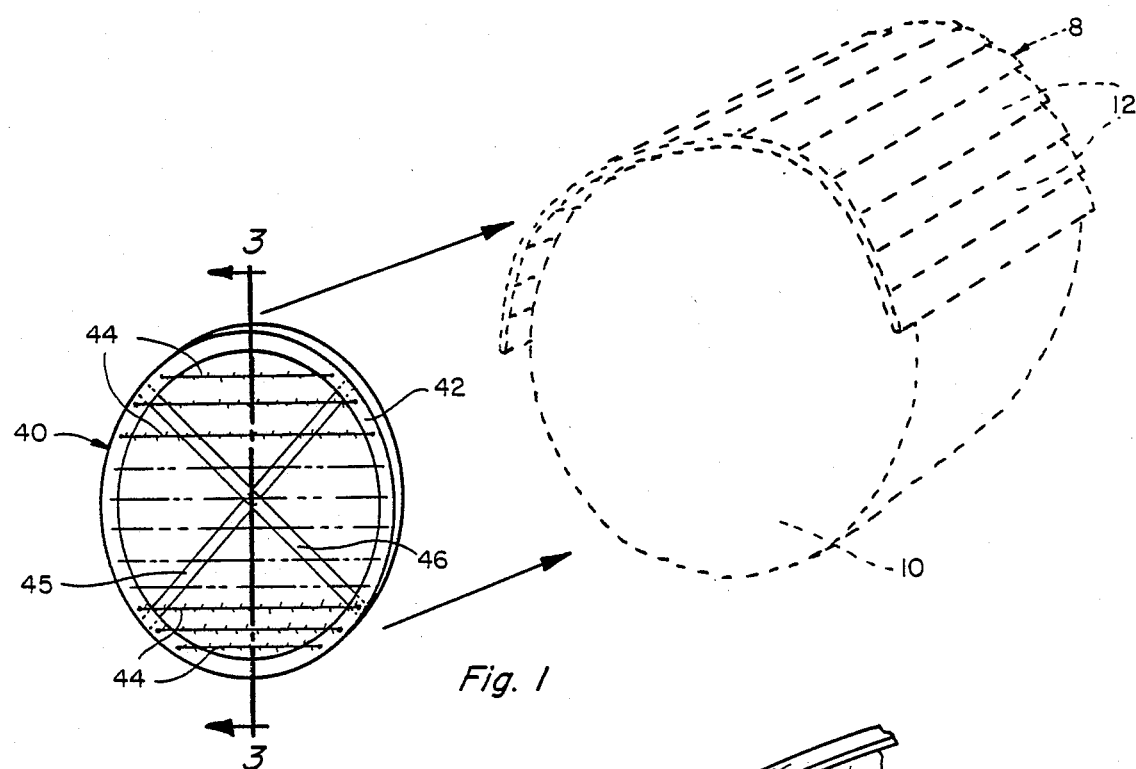
Fig. 1
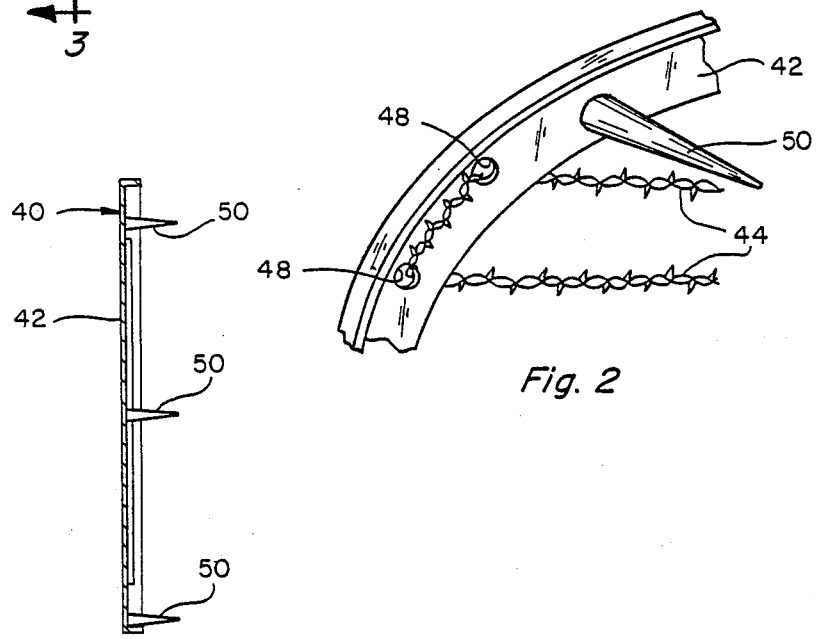
Fig. 2
Fig. 3

PROTECTION DEVICE FOR BALES

This invention relates generally to portable panel coverings for protecting products which may deteriorate from exposure to elements, including bales of hay, straw or similar materials and to end panels for preventing animals from eating such products when such panel coverings are in place. This application is a continuation in part of co-pending Ser. No. 364,856, filed Jun. 12, 1989. The specification and drawings of the parent application are hereby incorporated in and made a part of this application.

BACKGROUND OF THE INVENTION

It is well known to store bales of hay, straw or similiar materials and the bales may be the traditional rectangular bales or round bales. Such bales may be stacked outdoors or indoors. When stacked outdoors, such bales tend to deteriorate as a result of rain, snow, wind and other elements. When stored indoors, such bales tend to deteriorate when stacked together because the continued curing of the products in the bales generates heat and moisture which results in deterioration which may be in the form of molds. It is sometimes necessary to discard parts of the bales before the products can be consumed by animals. Also, animals tend to consume materials from such bales by eating from the end portions unprotected by the cover.

Many attempts have been made to protect stacks of baled products from the elements and from animals. For example, U.S. Pat. No. 252,168, patented by Angus in 1882, discloses a hay and grain cap made from a series of overlapping boards which are hooked together about the contour of the stack. U.S. Pat. No. 404,577, patented in 1889 by Thatcher, shows a hay cap made from slats being held in relative position by means of wires. U.S. Pat. No. 477,701 patented in 1892 by Rice, discloses another portable roof for protecting ricks or stacks of hay, straw or grain. U.S. Pat. No. 1,092,707 patented in 1914 by Freeland, discloses a self-adjusting hay cover formed of a plurality of sections and constructed of waterproof material such as galvanized sheet iron. U.S. Pat. No. 1,095,484, patented in 1914 by Wright, discloses a stack cover made from overlapping slats held in place by interlocking connections in the nature of hooks and eyes. U.S. Pat. No. 4,041,654 patented in 1977 by Nedila, discloses a cover for bales of hay and the like made from elongated panels adapted to be disposed on the top of a series of bales, each panel having means along its opposed longitudinal edge for engagement with additional panels which are disposed in side-by-side overlapping relationship with one another to cover the entire top of the stack of bales. This patent also discloses an anchor means for connecting the lower surface of the panel with the bales to secure the panel in place on the stack.

BRIEF SUMMARY OF THE INVENTION

This invention relates generally to a protection device in the nature of a portable panel covering for protecting products which may deteriorate from exposure to the elements, including bales of hay, straw or similiar materials and particularly relates to a protection device having associated therewith an end panel adapted to prevent animals from feeding from the end of a bale of hay or other material when the protection device is in place. The end panel has a frame with a screen incorporated inside the frame and adapted to keep animals from reaching in and feeding from the end of the bale of hay or other material. The frame will generally be an anular construction adapted to mate with the protection device so it may be essentially circular in construction when adapted to protect round bales and it may be rectangular in cross-section when adapted to mate with a protection device adapted to protect one or more long bales with a square or rectangular cross-section. The screen will generally be comprised of cords which are generally laced back and forth but which may be in any desired pattern. A particularly useful cord material is a wire cord with barbs known as gaucho wire. Also, the frame may have reinforcing bars as needed, depending on the service intended.

BRIEF DESCRIPTION OF SEVERAL VIEWS OF THE DRAWINGS

FIG. 1 is a perspective view showing a round bale in outline with the bale protection device shown in detached perspective.

FIG. 2 is a rear perspective of a segment of the end panel of FIG. 1.

FIG. 3 is a cross-section of the end panel of FIG. 1.

DETAILED DESCRIPTION OF THE INVENTION

Figure 4:
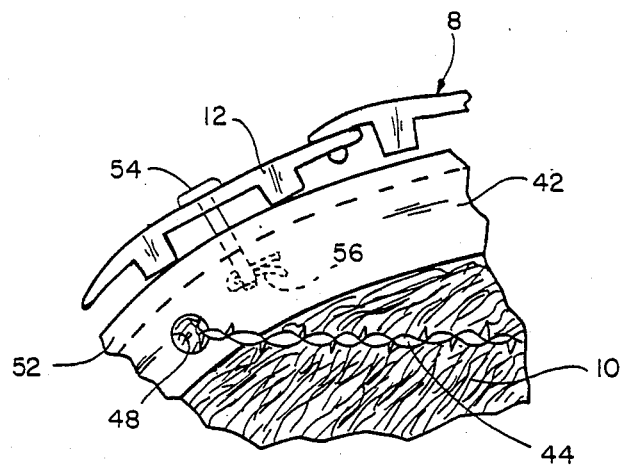
FIG. 4 is a partial end view showing a section of end panel with a section of cord.

In FIGS. 1-5, like numbers are used to represent the same element.

With reference to FIG. 1, protection device 8 comprised of slats 12 is shown in place on bale 10. Bale protection device end panel 40 is shown in detached perspective. End panel 40 is comprised of frame 42 with cords 44 traversing the frame. Optional reinforcing bars 46 are shown behind cords 44 which aids in not only reinforcing the frame but also serves as a backup to prevent pushing and distorting the cords to get at the contents of the bale.

With reference to FIG. 2, a section of frame 42 is shown with openings 48 which are adapted for stringing cord 44 so that when the ends are ultimately tied together a continuous cord forms a screen which will prevent animals from eating from the end of bale 10. Projecting in substantially perpendicular relationship from frame 42 is spike 50 adapted to push into the end of bale 10 and hold the end panel in place. Alternatively, spike 50 may be of unitary construction and inserted through an opening in frame 42. Additionally, frame 42 may be attached to protection device 8 in any convenient manner.

FIG. 3 shows a cross-section of end panel 40, including frame 42 and spikes 50.

FIG. 4 shows a partial end view showing slats 12 of protection device 8 overlapping frame 42 which has pin 54 projecting through slat 12 and through lip 52 and held in place by key 56. FIG. 4 also shows cord 44 projecting through opening 48 in frame 42.

Figure 5:
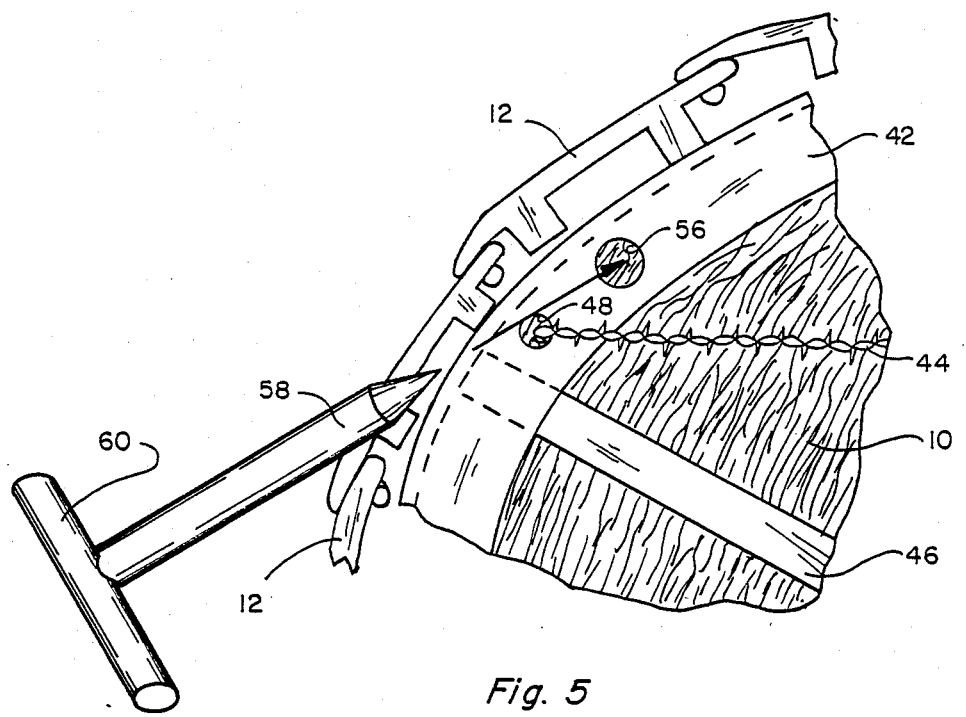
FIG. 5 is an end view similar to FIG. 4 showing an alternative method of attachment of the end panel to a bale.

FIG. 5 is a partial end view similar to FIG. 4 but showing hole 56 through which harpoon 58 may be projected to hold the end panel in place, with handle 60 serving as a stopper and as a convenience in inserting and removing the harpoon. Also, FIG. 5 shows cord 44 in the nature of gaucho wire laced through opening 48. Also, FIG. 5 includes reinforcing bar 46.

The materials of construction of the end panel of this invention will vary depending on the utilization and fabrication techniques. The frame of the end panel may preferably be made from polymeric materials and the preferred Polymeric materials are polyolefins such as polyethylene and polypropylene. Other polymeric materials may be used such as polyvinyl chloride resins, butadiene-styrene rubber compositions, natural rubber compositions, etc. For particular uses, it might be desirable to use more expensive and more rigid polyeric materials such as polycarbonates, reinforced nylons, etc. Also, the frame may be made from metals, such as aluminum, steel, treated iron. etc. The frame may also be made of wood, such as waterproof wood fibrous compositions.

The cords of this invention are preferably made from gaucho wire which is made from strands of wire twisted to form a cord with barbs contained within the string at periodic intervals. This commercial wire cord obtains its name from its initial commercial use in South America where gauchos string the wires to confine animals within large areas. Barbed wire, the American cousin to gaucho wire, can also be used in this invention although most barbed wire is heavier and more difficult to string within the frame. Composition cord materials may also be used and such composition cord materials may be treated with a known chemical to retard animals.

The screen of this invention may be made by interlacing a cord through holes in the frame and tying the tightened cord to retain the screen in position with tight cord lines, much as a tennis racket is strung. Alternative methods of making a screen would be to fabricate a screen with cords interwoven in alternative directions and the ends attached at their outer peripheries to the frame in any conventional manner.

The end panel of this invention may be preferably attached to the end of a bale by projecting a spike, which is attached to the frame, or a harpoon which may be inserted through a hole in the frame, into the contents of the bale. The length of the spike or harpoon will depend on the service but will generally be from 4 inches to a foot long. Alternatively, the end panel may be held in place by attachment to the protection device in any conventional manner. As described herein, the frame may be fabricated with a lip projecting inward to underlap the slats of the protection device with a hole therein adapted to mate with a hole in the slatted protection device through which a pin may be placed and held in position with a key. Any other known method of attachment may be used to hold the end panel in position attached to the protection device such as a knob projecting through an opening, wired together with separate wires, etc.

Thus, there has been shown and described a novel protection device which is particularly adapted to protect bales of straw, hay or similar materials with an end panel adapted to prevent animals from eating the contents when the protection device is in place. It will be apparent to those skilled in the art, however, that many changes, variation and modification of the subject protection device assembly are possible and or contemplated, and all such changes, variation and modification which do not depart from the spirit and scope of the present invention are deemed to be covered by the invention which is limited only by the claims which follows.

What is claimed is:

1. A protection device comprising a series of at least two overlapping elongated slats, said elongated slats having at least one projection on at least one side adapted to insure that said protection device will retain at least one air passage between said protection device and product being protected when said protection device is in place to protect said product, and having a flap along one edge of each of said elongated slats adapted to overlap an abutting slat, said elongated slats having means for holding adjacent elongated slats in movable relationship with each other and means for connecting together a series of said elongated slats to form said protection device, said protection device having associated therewith an end panel adapted to prevent animals from feeding from the end of the bale when said protection device is in place.

2. The protection device of claim 1 wherein said end panel is comprised of a frame with a wire screen.

3. The protection device of claim 2 wherein the screen is comprised of gaucho wire.

4. The protection device of claim 1 wherein said end panel includes at least one reinforcing bar.

5. The protection device of claim 1 wherein said frame of said end panel has a series of elongated spikes projecting from said frame.

6. The protection device of claim 1 wherein said end panel is attached to said protection device with an attaching means.

* * * * *